United States Patent
Geiger et al.

(10) Patent No.: US 9,709,596 B2
(45) Date of Patent: Jul. 18, 2017

(54) ACCELERATION SENSOR AND METHOD FOR PRODUCING AN ACCELERATION SENSOR

(71) Applicant: Northrop Grumman LITEF GmbH, Freiburg (DE)

(72) Inventors: Wolfram Geiger, Ebringen (DE); Julian Bartholomeyczik, Reutlingen (DE); Peter Leinfelder, Ehrenkirchen (DE)

(73) Assignee: Northrop Grumman LITEF GmbH (DE)

( * ) Notice: Subject to any disclaimer, the term of this patent is extended or adjusted under 35 U.S.C. 154(b) by 67 days.

(21) Appl. No.: 14/888,432

(22) PCT Filed: Mar. 27, 2014

(86) PCT No.: PCT/EP2014/000833
§ 371 (c)(1),
(2) Date: Oct. 31, 2015

(87) PCT Pub. No.: WO2014/177243
PCT Pub. Date: Nov. 6, 2014

(65) Prior Publication Data
US 2016/0069928 A1 Mar. 10, 2016

(30) Foreign Application Priority Data

May 2, 2013 (DE) ......................... 10 2013 007 593

(51) Int. Cl.
*G01P 15/125* (2006.01)
*G01P 15/08* (2006.01)

(52) U.S. Cl.
CPC ........ *G01P 15/125* (2013.01); *G01P 15/0802* (2013.01); *G01P 2015/0814* (2013.01); *G01P 2015/0882* (2013.01)

(58) Field of Classification Search
None
See application file for complete search history.

(56) References Cited

U.S. PATENT DOCUMENTS 6,133,670 A 10/2000 Rodgers et al.
7,047,808 B2 5/2006 Malvern et al.
(Continued)

FOREIGN PATENT DOCUMENTS

CN 1602428 A 3/2005
CN 101688775 A 3/2010
(Continued)

OTHER PUBLICATIONS

Decision of Patent Grant for Application No. JP 2016-510957 dated Dec. 6, 2016.
(Continued)

*Primary Examiner* — Clayton E Laballe
*Assistant Examiner* — Dennis Hancock
(74) *Attorney, Agent, or Firm* — Tarolli, Sundheim, Covell & Tummino LLP

(57) ABSTRACT

The invention relates to an acceleration sensor, comprising a substrate having a substrate surface and a sample mass that is movable relative to the substrate in a first direction (x) parallel to the substrate surface. The sample mass has a comb-like electrode that is movable together with the sample mass and has a plurality of teeth, which extend in the first direction (x). The acceleration sensor further comprises a counter-electrode fixedly connected to the substrate, which counter-electrode has a fixed comb-like electrode and wherein said fixed comb-like electrode has a plurality of teeth which extend in a direction opposite to the first direction (x). The teeth of the movable comb-like electrode engage with the teeth of the fixed comb-like electrode. The acceleration sensor further comprises a shielding electrode (Continued)

fixedly connected to the substrate and which is suitable for increasing a pneumatic damping of the sample mass during a deflection movement of the sample mass.

9 Claims, 3 Drawing Sheets

(56) References Cited

U.S. PATENT DOCUMENTS

| | | | |
|---|---|---|---|
| 8,590,376 B2 | 11/2013 | Heller et al. | |
| 2005/0019974 A1* | 1/2005 | Lutz | B81B 3/0054 |
| | | | 438/52 |
| 2006/0246631 A1* | 11/2006 | Lutz | B81B 3/0005 |
| | | | 438/127 |
| 2007/0029629 A1 | 2/2007 | Yazdi | |
| 2012/0031185 A1 | 2/2012 | Classen et al. | |
| 2015/0301075 A1* | 10/2015 | Yamanaka | G01P 15/125 |
| | | | 73/1.38 |

FOREIGN PATENT DOCUMENTS

| | | |
|---|---|---|
| CN | 102356300 A | 2/2012 |
| DE | 102007030119 A1 | 1/2009 |
| DE | 102008016004 A1 | 10/2009 |
| DE | 102010039069 A1 | 2/2012 |
| DE | 102011083487 A1 | 3/2013 |
| WO | 2006105314 A1 | 10/2006 |

OTHER PUBLICATIONS

Chinese Search Report for Application No. 2014800251351 dated Mar. 22, 2017.

\* cited by examiner

ACCELERATION SENSOR AND METHOD FOR PRODUCING AN ACCELERATION SENSOR

The invention is concerned with an acceleration sensor and a method for producing such an acceleration sensor. In particular, the invention is concerned with a micro-electro-mechanical acceleration sensor for measuring acceleration parallel to a substrate surface of the acceleration sensor as well as with a method for producing such a micro-mechanical acceleration sensor.

Micro-electro-mechanical acceleration sensors are micro systems or also MEMS (micro-electro-mechanical systems) which are capable to detect accelerations. Typically, to this end, at least one sample mass (or also pendulum) is provided which is deflected relative to a substrate of the sensor by an acceleration of the sensor. To this end, the sample mass may be connected movably to the substrate, e.g. by means of a spring.

To detect the acceleration an electrode (in the following: "movable electrode") is part of the sample mass and on the substrate a fixed counter electrode is arranged opposite to the movable electrode. If the distance between the movable electrode and the counter electrode changes because of a deflection of the sample mass, this is detected by a control loop (closed-loop) and an according voltage is applied to the electrodes, which leads to a reset of the sample mass. Here, the height of the applied voltage is used to determine the acceleration.

In order to be able to detect accelerations in more than one dimension, for example, three identical acceleration sensors may be provided, each of which having its detection axis aligned with one of the spatial axes, respectively. Alternatively or additionally it is possible that several samples masses that can be deflected in different directions are provided on the same substrate.

Because of their advantageous linear behavior, acceleration sensors with electrodes engaging with each other (or being interleaved) have been proven to be of value. Here, the movable electrode and the counter electrode are formed as comb-like electrodes, wherein the teeth of the respective combs engage with each other. The movable electrode and the counter electrode form in this way a capacitor, wherein a reset voltage, which has to be applied to the electrodes of the capacitor for a reset, is linear to the deflection of the sample mass for almost all deflections.

A problem of this arrangement of interleaved electrodes is, however, a lack of damping such that at high accelerations e.g. the movable electrode may hit the counter electrode or a spacer, which may lead to mechanical defects and inaccurate or unusable measurement results.

The present invention has therefore the object to provide an acceleration sensor with engaging comb-like electrodes that has an increased damping of the deflection movement of the sample mass. This object is solved by the subject-matter of the independent claims. Advantageous embodiments are defined in the dependent claims.

An acceleration sensor according to the present invention may comprise e.g. a substrate, which has a substrate surface. Further, the acceleration sensor may comprise a sample mass, which is movable relative to the substrate substantially along a positive deflection direction (x) parallel to the substrate surface, wherein the sample mass comprises a comb-like electrode movable together with the sample mass, and wherein the movable comb-like electrode comprises a plurality of teeth that extend along the positive deflection direction (x). The acceleration sensor may further comprise a counter electrode fixedly connected with the substrate, wherein the counter electrode comprises a fixed comb-like electrode, and wherein the fixed comb-like electrode comprises a plurality of teeth that extend in a direction opposite to the positive deflection direction (x), and wherein the teeth of the movable comb-like electrode engage with the teeth of the fixed comb-like electrode. Further, the acceleration sensor may comprise a shielding electrode which is fixedly connected with the substrate, which is suitable to increase a pneumatic damping of the sample mass during a deflection movement of the sample mass.

In what follows, the term "pneumatic damping" denotes e.g. a damping due to an increase or reduction of a partial volume, wherein e.g. gas streams from a partial volume, which is reduced, to a partial volume, which is increased. The term "pneumatic damping" will be detailed further below.

Further, the movable comb-like electrode may comprise a comb frontward side with a comb frontward surface, which is substantially perpendicular to the positive deflection direction (x). The shielding electrode may comprise a shielding electrode surface, which is substantially parallel to the comb frontward surface.

Here, the comb frontward surface and the shielding electrode surface may be opposite to each other. During a deflection movement of the sample mask a distance between the comb frontward surface and the shielding electrode surface may change, wherein a change of the distance is suitable to increase a pneumatic damping of the sample mass.

The sample mass may e.g. be deflected during an acceleration due to its inertia and may be moved after a given time back to its rest position by elastic reset forces. Further, e.g. a voltage that is applied to the movable comb-like electrode and the fixed comb-like electrode or to the counter electrode may result in a deflection of the sample mass due to electrostatic forces. During a deflection movement of the sample mass the changing distance between the opposite surfaces (of the comb frontward surface and the shielding electrode surface) may have the result that a volume between the comb frontward surface and the shielding electrode surface changes, for example. A change of the volume may contribute to an increase of pneumatic damping of the sample mass.

Further, the sample mass and the shielding electrode may have the same electric potential.

To this end, the sample mass and the shielding electrode may for example be brought to the same electric potential by applying a voltage by means of according electrical connections. If the sample mass and the shielding electrode have the same electric potential, there are no attracting or repelling electrostatic forces between them. Hence, a deflection movement of the sample mass is not disturbed by electrostatic forces between the sample mass and the shielding electrode. This may increase the accuracy of an acceleration measurement.

The counter electrode and the shielding electrode may be mechanically connected to each other by an isolation layer.

The isolation layer may e.g. be an oxide layer, which ensures an electric isolation between the shielding electrode and the counter electrode. If the counter electrode and the shielding electrode are mechanically connected to each other, this may have the advantage that the shielding electrode may be formed more thinly, as the counter electrode ensures mechanical stability. Due to this, space may be saved and/or mechanical stability can be achieved, for example.

The sample mass may, for example, comprise a further movable comb-like electrode, which is movable with the sample mass, wherein the further movable comb-like electrode comprises a plurality of teeth, which extend along a direction opposite to the positive deflection direction (x). The acceleration sensor may further comprise a further counter electrode fixedly connected to the substrate, wherein the further counter electrode comprises a further fixed comb-like electrode, and wherein the further fixed comb-like electrode comprises a plurality of teeth, which extend along the positive deflection direction (x), and wherein the teeth of the further movable comb-like electrode engage with the teeth of the further fixed comb-like electrode. The acceleration sensor may comprise a further shielding electrode fixedly connected to the substrate, which is suitable to increase pneumatic damping of the sample mask during a deflection movement of the sample mass.

Due to the further movable comb-like electrode and the further fixed comb-like electrode e.g. acceleration in the positive deflection direction (x) as well as in the direction opposite to the positive deflection direction (x) may be detected more accurately. Then, there exist respective electrodes for detecting of acceleration or for resetting of the sample mass for deflections along the positive as well as along the negative x direction.

The shielding electrode and the further shielding electrode may be integrally connected to each other.

To this end, e.g. a single electrode may be provided that functions as shielding electrode as well as further shielding electrode. This may be advantageous e.g. for the mechanical stability of the shielding electrode or the further shielding electrode. In addition, by such an arrangement e.g. space on the substrate may be saved, as an interval between the shielding electrode and the further shielding electrode may be omitted.

The acceleration sensor may further comprise at least one spring element that couples the sample mass and the substrate with each other such that the sample mass can perform a deflection movement along the positive deflection direction (x) and such that the sample mass is substantially rigidly supported along a direction (y) parallel to the substrate surface and perpendicular to the positive deflection direction (x).

Also support of the sample mass in a direction (z) perpendicular to the substrate surface may be substantially rigid.

Due to a rigid support of the sample mass in directions along which no deflection movement or acceleration is to be detected accuracy of acceleration measurement may be increased, for example, as a distance between the movable comb-like electrode and the fixed comb-like electrode changes only along the x-direction, but not along the y-direction or the z-direction.

A method for producing an acceleration sensor may comprise: forming a substrate, which comprises a substrate surface; and forming a sample mass, which is movable relative to the substrate along a positive deflection direction (x), which is substantially parallel to the substrate surface, wherein the sample mass comprises a comb-like electrode movable together with the sample mass, and wherein the movable comb-like electrode comprises a plurality of teeth, which extend along the positive deflection direction (x). The method may further comprise: forming a counter electrode fixedly connected to the substrate, wherein the counter electrode comprises a fixed comb-like electrode, and wherein the fixed comb-like electrode comprises a plurality of teeth, which extend along a direction opposite to the positive deflection direction (x), and wherein the teeth of the movable comb-like electrode engage with the teeth of the fixed comb-like electrode; and forming a shielding electrode fixedly connected with the substrate, which is suitable to increase pneumatic damping of the sample mass during a deflection movement of the sample mass.

The method for producing an acceleration sensor may further comprise: adapting a gas pressure of the acceleration sensor, in order to adjust optimal damping of the deflection movement of the sample mass.

The method for producing an acceleration sensor may further comprise: selecting of a distance between the movable comb-like electrode and the shielding electrode at a predetermined gas pressure of the acceleration sensor, in order to adjust optimal damping of the deflection movement of the sample mass.

Here, e.g. an optimal gas pressure (or filling pressure) or an optimal distance between the movable comb-like electrode and the shielding electrode may lead to optimal damping of the sample mass. Further, the selection of the gas type used for filling the acceleration sensor may have the result that optimal damping can be achieved. For optimal damping, the damping is neither that high that the sample mass is damped to strong and can therefore not be deflected sufficiently nor so weak that e.g. the movable and the fixed comb-like electrode or the movable electrode or the sample mass and a spacer hit each other.

In what follows embodiments of the invention, their functioning as well as their advantages will be described with respect to the figures. Elements of the embodiments may be combined with each other as long as they do not exclude each other.

Figure 1:
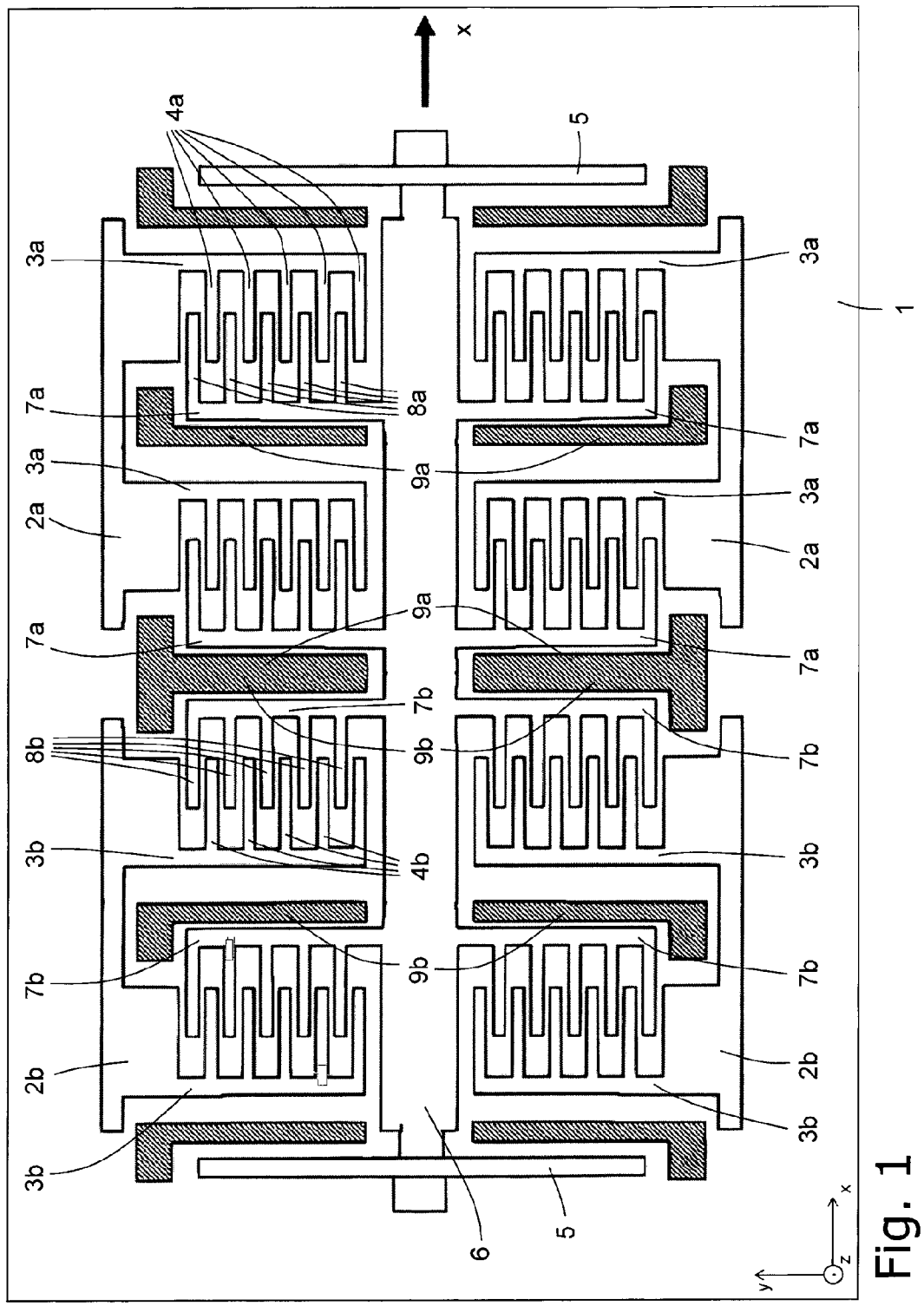
FIG. 1 shows a schematic top view of an acceleration sensor according to the present invention.

FIG. 1 shows in schematic top view of an acceleration sensor for measuring acceleration along a positive deflection direction (x direction) parallel to the plane of projection. In the plane of projection, there is a substrate surface of a substrate 1, on which further elements of the acceleration sensor are arranged. Hence, in what follows the x-axis is a sensitive axis along which (negative or positive) accelerations are measured. The y-axis is perpendicular to the x-axis and is arranged in the illustration of FIG. 1 parallel to the plane of projection or parallel to the substrate surface of the substrate 1. The z-axis is perpendicular to the x-axis and the y-axis and, hence, a normal to the plane of projection of FIG. 1 or to the substrate surface.

Counter electrodes 2a and further counter electrodes 2b are fixedly connected to the substrate 1. According to the embodiment of FIG. 1 two counter electrodes 2a and two further counter electrodes 2b are illustrated, respectively, wherein the number of counter electrodes 2a or further counter electrodes 2b is not limited to this. There may also be e.g. only one counter electrode 2a and one further counter electrode 2b, respectively, or more than two counter electrodes 2a and more than two further counter electrodes 2b, respectively. Further, also e.g. only counter electrodes 2a and no further counter electrodes 2b may be provided.

The counter electrodes 2a fixedly connected to the substrate 1 comprise fixed comb-like electrodes 3a, each of which comprises several teeth 4a that extend along the negative x direction, i.e. in a direction that is opposite to the positive deflection direction (x). The fixed comb-like electrodes are indicated as "fixed", since they or the respective counter electrode 2a are fixedly connected to the substrate. The fixed comb-like electrode may e.g. be formed such that they comprise a comb frontward side as well as several teeth 4a extending perpendicular from the comb frontward side.

Analog to this, the further counter electrodes 2b, which are fixedly connected to the substrate 1, may comprise further fixed comb-like electrodes 3b that comprise several teeth 4b, which extend along the positive deflection direction (x). Also these further fixed comb-like electrodes may comprise a comb frontward side and several teeth 4b extending therefrom as described above. According to the embodiment of FIG. 1 each counter electrode 2a and each further counter electrode 2b has two comb-like electrodes (fixed comb-like electrodes 3a or fixed further comb-like electrodes 3b), respectively, wherein the number of fixed comb-like electrodes 3a or fixed further comb-like electrodes 3b is not limited thereto. For example, per counter electrode 2a or per further counter electrode 2b also only one fixed comb-like electrode 3a or one further fixed comb-like electrode 3b may be provided, respectively, or more than two fixed comb-like electrodes 3a or more than two further fixed comb-like electrodes 3b may be provided, respectively.

In addition, embodiments are conceivable in which only counter electrodes 2a and no further counter electrodes 2b are provided such that only counter electrodes 2a that comprise comb-like electrodes 3a, the teeth 4a of which extend along the negative x direction, are fixed to the substrate.

By means of one or several spring elements 5 a sample mass 6 often also denoted as "pendulum" is connected to the substrate 1. The spring element 5 couples the sample mass 6 and the substrate 1 such to each other that the sample mass 6 can perform a deflection movement along the positive deflection direction (positive x-direction) and along a direction (negative x-direction) opposite to the positive deflection direction. Because of inertia, here, the sample mass 6 is deflected relative to the substrate 1 in positive x-direction during e.g. an acceleration of the substrate 1 along the negative x-direction. The sample mass 6 is connected via the spring elements 5 such with the substrate 1 that it may be deflected along the positive and the negative x-direction, but such that it is substantially rigidly supported in the y-direction as well as in the z-direction.

The sample mass 6 comprises at least one comb-like electrode 7a movable together with the sample mass 6, wherein this "movable" comb-like electrode 7a is connected fixedly to the sample mass 6 and is hence supported movably relative to the substrate 1. The number of the movable comb-like electrodes 7a may depend e.g. from the number of fixed comb-like electrodes 3a in so far that for one fixed comb-like electrode 3a one movable comb-like electrode 7a may be provided on the sample mass 6.

The at least one movable comb-like electrode 7a may comprise e.g. a comb frontward side and several teeth 8a, wherein the teeth 8a of the movable comb-like electrode 7a extend in the positive deflection direction (x), i.e. in the positive x-direction. The movable comb-like electrode 7a and the fixed comb-like electrode 3a are arranged as engaging electrodes. Hence, the teeth 8a of the movable comb-like electrode 7a and the teeth 4a of the fixed comb-like electrode 3a engage with each other. The teeth 8a and 4a may e.g. engage such that if viewed along the y-direction, one tooth 8a of the movable comb-like electrode 7a and one tooth 4a of the fixed comb-like electrode 3a alternate.

There may be provided e.g. for each fixed comb-like electrode 3a one movable comb-like electrode 7a.

Analog to this, the sample mass 6 may comprise at least one further movable comb-like electrode 7b that is movable together with the sample mass 6. For example, for one further fixed comb-like electrode 3b one further movable comb-like electrode 7b may be provided.

Also the further movable comb-like electrode 7b may comprise a comb frontward side and a plurality of teeth 8b, wherein the teeth 8b of the further movable comb-like electrode 7b extend along the negative x-direction, i.e. along the direction opposite to the positive deflection direction (x).

Analog to the embodiments described above with respect to the fixed comb-like electrode 3a and the movable comb-like electrode 7a, also the teeth 8b of the further movable comb-like electrode 7b may engage with the teeth 4b of the further fixed comb-like electrode 4b.

The teeth of the comb-like electrodes described above engage e.g. such with each other that they do not touch each other in an idle mode of the acceleration sensor. Preferably, sufficient space in positive and negative x-direction should be provided between the teeth such that during a deflection movement of the sample mass 6, a contact between the respective comb-like electrodes does not occur. The arrangement of interrelated electrodes or comb-like electrodes engaged with each other has the advantage that a reset voltage applied to the electrodes is approximately linear to the deflection of the sample mass 6 for almost all voltages. To ensure this linearity it may e.g. be advantageous to provide a sufficient distance along the x-direction between the comb-like electrodes engaging with each other such that nonlinear plate capacitor effects between the tips of the teeth and the opposite comb frontward sides may be essentially suppressed and can therefore be neglected.

The acceleration sensor is preferably filled with a gas having a predetermined pressure. Hence, between the teeth of the comb-like electrodes there is gas or in particular gas molecules. If during a deflection movement of the sample mass 6 e.g. a movable comb-like electrode 7a is moving towards a fixed comb-like electrode 3a, the gas has to stream out of the space between the teeth. This leads to a certain "pneumatic damping" of the oscillation or the deflection movement of the sample mass 6.

The term pneumatic damping means in what follows, hence, a damping due to an increase or decrease of a partial volume, wherein e.g. gas streams from a partial volume, which decreases, to a partial volume, which increases. Here, pressure differences between the partial volumes are generated, as the gas can stream only with a finite velocity from one partial volume into the other partial volume due to its viscosity. Hence, e.g. the overpressure in the partial volume that is decreased leads to a force on the outer walls of the contracting volume. The deflection movement or the oscillation is damped, as there is a counter force that acts against the deflection movement of the sample mass 6.

The pneumatic damping that is caused by the changing volume between the teeth of the comb-like electrodes is often not sufficient to achieve the desired high damping.

Therefore, in the acceleration sensor of the present invention additional shielding electrodes 9a are provided, which increase the pneumatic damping of the sample mass 6. The shielding electrodes 9a are preferably fixedly connected to the substrate 1 similar to the counter electrodes 2a such that the counter mass 6 is deflected relative to the shielding electrodes 9a. The shielding electrodes 9a may e.g. be arranged such that a shielding electrode surface of the shielding electrodes 9a is directed towards the direction of the movable comb-like electrodes 7a of the sample mass 6. In particular, the shielding electrodes 9a may comprise a shielding electrode surface, which is substantially parallel to a comb frontward surface of the movable comb-like electrodes 7a and is arranged opposite thereto. The shielding electrode surface and the comb-like electrode surface may, here, be e.g. substantially perpendicular to the positive deflection direction (x). Hence, the comb frontward surface moves towards the shielding electrode surface during a deflection movement of the sample mass 6, which increases, due to the contracting volume between the shielding electrode 9a and the movable comb-like electrode 7a, pneumatic damping of the deflection movement of the sample mass 6.

Further, to increase the damping of the sample mass 6 further shielding electrodes 9b may be provided next to the comb frontward sides of the further movable comb-like electrodes 3b. In particular, the at least one further movable comb-like electrode 3b may comprise a comb frontward surface, which is substantially perpendicular to the positive deflection direction (x). In addition, the further shielding electrode 9b may comprise a shielding electrode surface, which is substantially parallel to the comb frontward surface of the further movable comb-like electrode 3b, wherein the shielding electrode surface is opposite to the comb frontward surface. During a deflection movement of the sample mass 6 a distance between the comb frontward surface and the shielding electrode surface gets reduced. Hence, also the further shielding electrodes 9b contribute to pneumatic damping of the deflection movement or the oscillation.

As is shown in FIG. 1 also combined shielding electrodes may be provided, which function simultaneously as shielding electrodes 9a and as further shielding electrodes 9b. To this end, the shielding electrode 9a and the further shielding electrode 9b may be connected integrally with each other. This combined shielding electrode may e.g. comprise two parallel shielding electrode surfaces, wherein one of the shielding electrode surfaces faces a comb frontward surface of a movable comb-like electrode 7a and the other of the shielding electrode surfaces faces a comb frontward surface of a further movable comb-like electrode 7b. Thus, the combined shielding electrode may effectively damp deflection movements of the sample mass along the positive as well as along the negative x direction.

Figure 2:
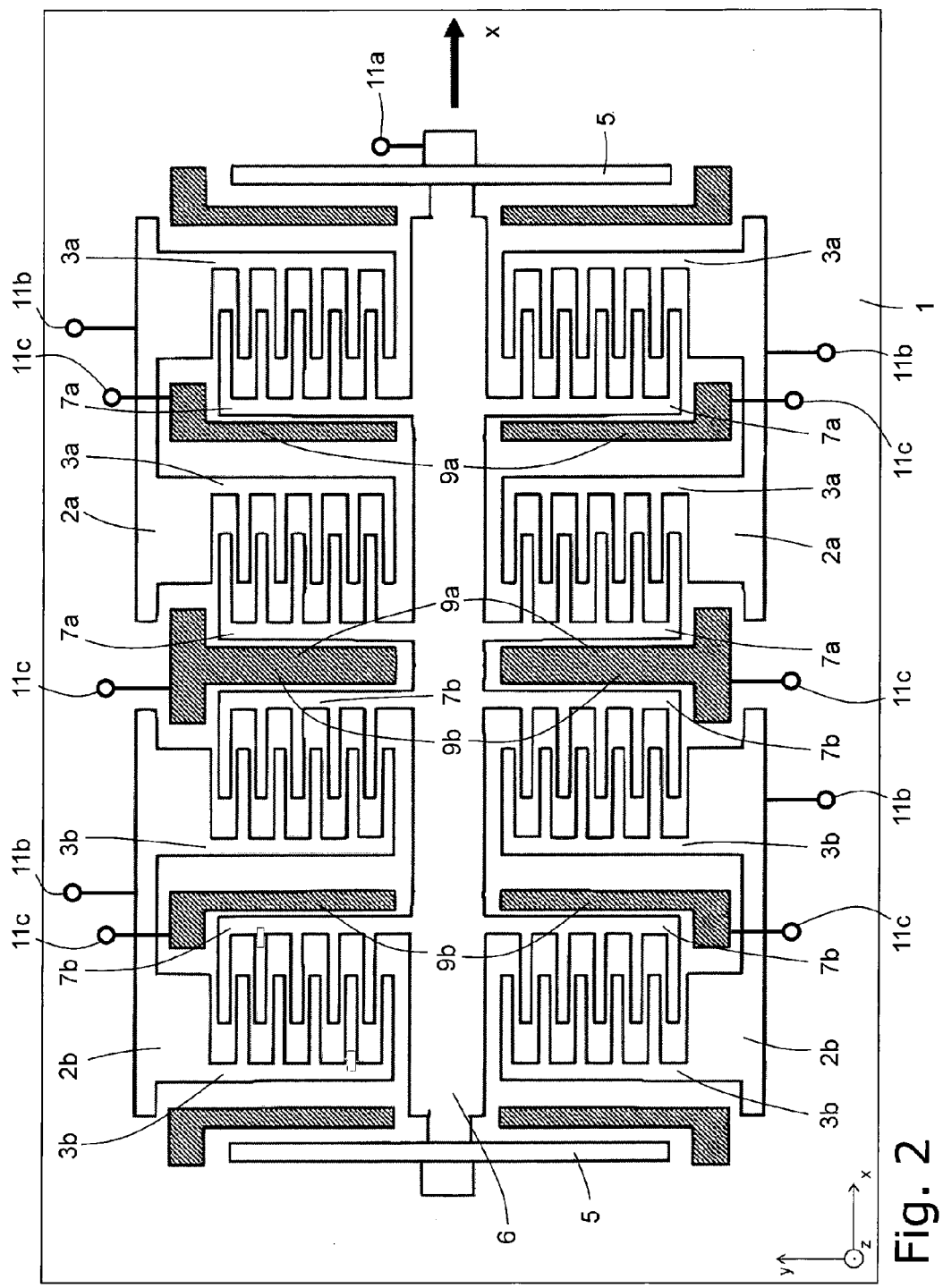
FIG. 2 shows a schematic top view of an acceleration sensor according to the present invention, wherein electric wiring facilities of the sample mass, the counter electrodes, and the shielding electrodes are illustrated schematically.

FIG. 2 shows a schematic top view of a further embodiment of an acceleration sensor according to the present invention. The acceleration sensor shown in FIG. 2 comprises essentially the same elements as the acceleration sensor illustrated in FIG. 1, wherein the same elements are denoted by the same reference signs.

In FIG. 2 the electric wiring facilities of the respective electrodes are illustrated schematically. Here, an electric terminal 11a of the sample mass 6 or of the movable comb-like electrode 7a or the further movable comb-like electrode 7b may be provided. Further, electrical terminals 11b for the counter electrodes 2a and the further counter electrodes 2b or for the respective fixed comb-like electrodes 3a and further comb-like electrodes 3b may be provided.

During a closed loop operation the deflection of the sample mass may be detected via the electric terminal 11a of the sample mass 6 and the electric terminals 11b of the counter electrodes 2a or the further counter electrodes 2b and by means of an according control loop a reset voltage may be applied thereto, which leads to resetting of the sample mass to its initial position.

If the acceleration sensor is operated in an open loop mode, a change of capacity may be measured via the electric terminals 11a or 11b, based on which the acceleration of the acceleration sensor may be computed.

Further, electric terminals 11c may be provided for the shielding electrodes 9a or for the further shielding electrodes 9b. Via the electric terminals 11c the shielding electrodes 9a or the further shielding electrodes 9b may be brought to a common electric potential. To this end, the electric terminals 11c of the shielding electrodes 9a and the further shielding electrodes 9b may for example be connected with each other.

In addition, the shielding electrodes 9a or the further shielding electrodes 9b may be brought to the same electric potential as the sample mass 6 via their electric terminals 11c. If the shielding electrodes and the sample mass 6 have the same electric potential, also the shielding electrodes and the respective movable comb-like electrodes 7a or further movable comb-like electrodes 7b have the same electric potential. This has the effect that there are no undesired electrostatic forces between the shielding electrodes 9a or further shielding electrodes 9b and the respective opposite movable comb-like electrodes 7a or the further movable comb-like electrodes 7b.

Figure 3:
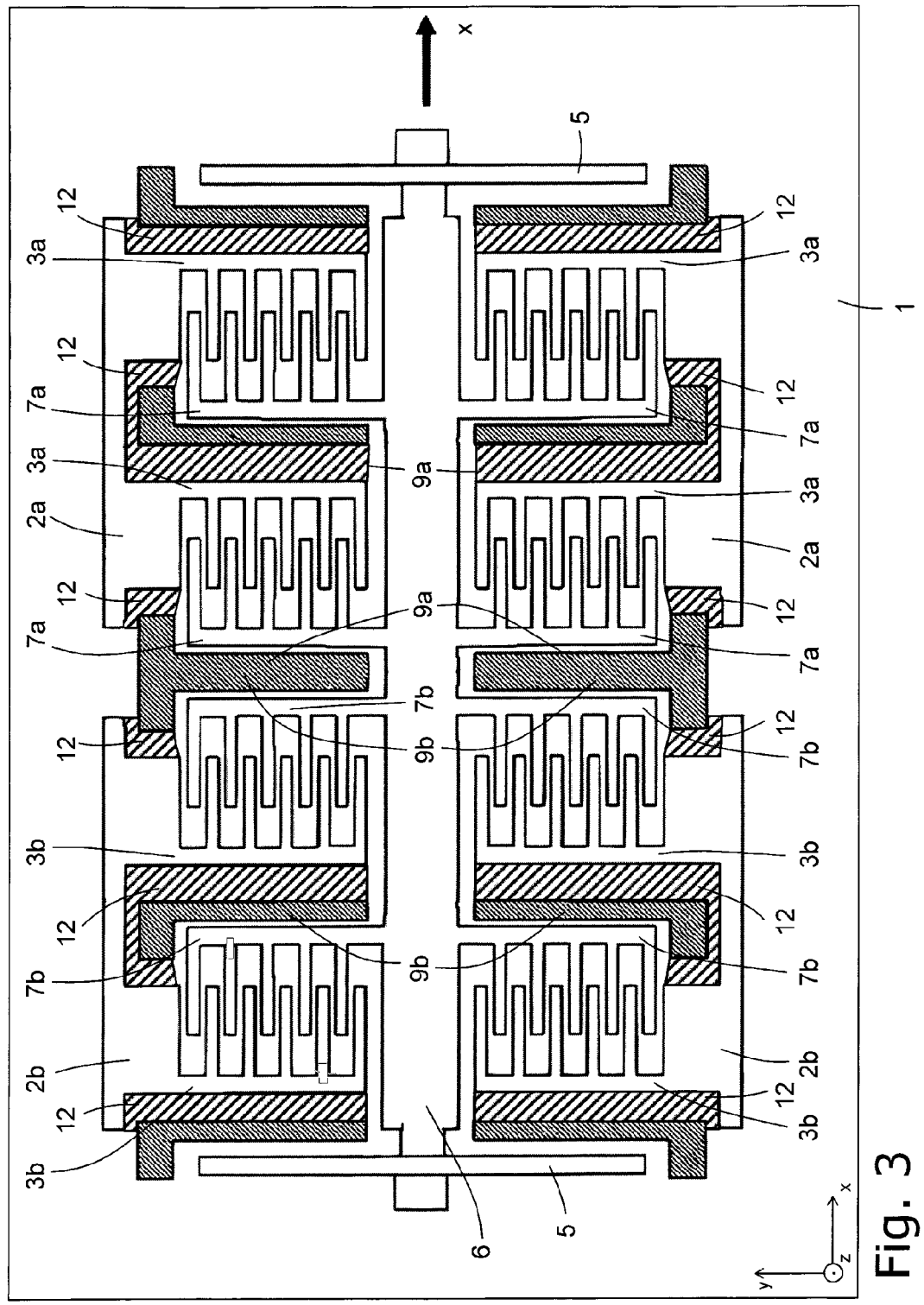
FIG. 3 shows a schematic top view of an acceleration sensor according to the present invention, wherein the counter electrodes and the shielding electrodes are mechanically connected with each other via an isolation layer.

FIG. 3 shows a schematic top view of a further embodiment of an acceleration sensor according to the present invention. The acceleration sensor shown in FIG. 3 comprises essentially the same elements as the acceleration sensor illustrated in FIG. 1, wherein the same elements are denoted by the same reference signs.

In the acceleration sensor illustrated in FIG. 3 the shielding electrodes 9a or the further shielding electrodes 9b are connected to the respective counter electrodes 2a or further counter electrodes 3b mechanically via a plurality of isolation layers 12. Thus, the shielding electrodes 9a and the counter electrodes 2a form an integral structure, which improves the stability of the arrangement considerably. Hence, it is e.g. possible to form the shielding electrodes 9a more thinly than in the embodiment of FIG. 1. The isolation layer 12 is preferable to isolate the shielding electrodes 9a and the counter electrodes 2b electrically from each other. Such an electric isolation is e.g. in particular then reasonable, if the shielding electrodes 9a, 9b and the sample mass have the same electric potential.

To adjust a strength of the damping caused by the shielding electrodes 9a, 9b e.g. two options are conceivable, which may be combined arbitrarily with each other.

For example, in a manufacturing process or after a manufacturing process a gas pressure (or filling pressure or inner pressure) of the acceleration sensor may be adapted such that an optimal damping of the sample mass 6 is achieved. Here, the strength of the pneumatic damping at usual gas pressures (or filling pressures) may increase with the height of the gas pressure. At higher gas pressures the damping becomes independent of gas pressure. There is an optimal value, as the strength of the damping should neither be too high nor too low.

Further, for example during a manufacturing process or already in a design process, the distance between the movable comb-like electrode 7a (or the further movable comb-like electrode 7b) and the shielding electrode 9a (or the further shielding electrode 9b) may be adjusted such that optimal damping of the deflection movement of the sample mass 6 is achieved. For filling pressures that are usual for acceleration sensors (e.g. 1 millibar to bar), the strength of the damping is the higher the smaller this distance is.

Naturally, both aforementioned methods may be combined to adjust an optimal damping.

Further aspects of the invention will be described in what follows.

The invention is related to the use of shielding electrodes 9a, 9b for increasing of the damping in an MEMS acceleration measuring device. For structures with engaging electrodes (cf. FIG. 2) but without shielding electrodes there is a linear behavior and a simple controller design, but only little damping.

This may lead to an undesired alignment, if vibrations occur. By using additional specifically designed electrodes (shielding electrodes 9a, 9b), for a predetermined pressure the damping can be adjusted via the gap width such that it has an optimal value.

In the conventional arrangement of engaging fingers (without shielding electrodes) the damping becomes quickly to low. This results in a reduced reset range. Here, gas pressures are often chosen high, to achieve a sufficiently high damping. However, this has the result that because of temperature there are high pressure variations inside the sensor and hence danger of mechanical tensioning. To be able to work with smaller pressures, very narrow gaps between electrodes have to be formed. This results in highest requirements in the manufacturing technology and is hence no satisfactory solution.

The electrode designs of the present invention with engaging fingers as shown in FIG. 1 leads, for a correct layout, to a nearly constant and linear force characteristic of the electrostatic forces in dependence of the deflection along the x direction, however, with little damping. The shielding electrodes 9a, 9b in plate capacitor arrangement may have e.g. the same electric potential as the movable comb-like electrodes 7a, 7b, for which reason they are ineffective in respect of their electrostatic force effects, as well as to the non-linearity of this arrangement with respect to the force effects, and may hence only contribute via the gas filling to the damping. A further advantage of the invention is that it may be realized with almost every processing technology. A further advantage is that the whole active structure (all movable as well as non-movable parts) may be produced with a single DRIE etch processing step, which allows highest possible manufacturing accuracy.

In FIG. 1 an acceleration measuring device with engaging electrodes according to the present invention is shown.

The acceleration measuring device consists in its essential parts of a sample mass 6—also denoted as pendulum or sensitive mass, which may be divided into a support structure, movable or oscillatory electrodes 7a with effective direction in positive x-direction, movable or oscillatory electrodes 7b with effective direction in negative x-direction as well as beam in bending springs 5, which couple the movable structure to locally fixed anchors. Opposed to the movable electrodes 7a, 7b fixed electrodes 3a, 3b are arranged. The latter serve to provide electrostatic forces to the movable structure 6, if suitable electric voltage is applied. Fixed electrodes 3a, 3b and the movable electrodes 7a, 7b arranged on the movable structure 6 engage intermittently with each other. Here, it is to be noted that between the front ends of a single electrode tooth and the bottom end of the opposite teeth sufficient free space remains such that the effect of a plate capacitor arrangement and, hence, of its non-linearity remains subordinated.

Between the frontward side of the fixed electrodes 3a, 3b and the frontward sides of the movable electrodes 7a, 7b shielding electrodes 9a, 9b are inserted. Preferably, these have the same but separated electric potential as the movable electrodes 7a, 7b. By this, the attenuation of the electrostatic forces along the desired direction due to the counter forces effective on the frontward sides of the electrodes is prevented. The more important aspect herein is that these shielding electrodes 9a, 9b are suitable for use as damping elements due to their large surfaces, e.g. between the shielding electrode 9a and the movable comb-like electrode 7a as well as the plate capacitor arrangement.

The damping may be adjusted optimally via the size of the gap between the shielding electrodes 9a, 9b and the movable comb-like electrodes 7a, 7b as well as by the gas pressure. The advantage to achieve large damping values easily and the advantage of a conventional electrical arrangement with engaging electrodes without shielding electrodes 9a, 9b, i.e. very small non-linearity and small vibration alignment are combined with each other due to the insertion of the shielding electrodes 9a, 9b as shown in FIG. 1.

Depending on the manufacturing method it is also possible to combine the shielding electrodes 9a, 9b and the fixed electrodes 3a, 3b in a combined electrode structure. Between the shielding electrodes 9a, 9b and the electrodes 3a, 3b may then e.g. be provided an isolation layer, e.g. an oxide layer. Naturally, the same holds, if the shielding electrodes 9a, 9b and the electrodes 3a, 3b should form a unit. An advantage of this might be that the structural rigidity is already provided by the electrodes 3a, 3b. Hence, in this embodiment a large part of space requirements for the shielding electrodes 9a, 9b is not present inclusive of the respective gap.

The invention claimed is:

1. An acceleration sensor, comprising:
a substrate having a substrate surface;
a sample mass movable relative to the substrate along a positive deflection direction which is substantially parallel to the substrate surface, the sample mass comprising a movable comb-like electrode that is movable together with the sample mass, the movable comb-like electrode comprising a plurality of teeth which extend along the positive deflection direction;
a counter electrode fixedly connected to the substrate and comprising a fixed comb-like electrode, the fixed comb-like electrode comprising a plurality of teeth which extend along a direction opposite to the positive deflection direction, the teeth of the fixed comb-like electrode configured to engage with the teeth of the movable comb-like electrode; and
a shielding electrode fixedly connected to the substrate and configured to increase pneumatic damping of the sample mass during a deflection movement of the sample mass,
wherein the movable comb-like electrode further comprises a comb frontward side with a comb frontward surface that is substantially perpendicular to the positive deflection direction,
wherein the shielding electrode comprises a shielding electrode surface that is substantially parallel to the comb frontward surface,
wherein the comb frontward surface and the shielding electrode surface are opposite to each other,
wherein a distance between the comb frontward surface and the shielding electrode surface changes during a deflection movement of the sample mass, the change of the distance being suitable to increase pneumatic damping of the sample mass.

2. The acceleration sensor of claim 1, wherein the sample mass and the shielding electrode have the same electric potential.

3. The acceleration sensor of claim 1, wherein the counter electrode and the shielding electrode are connected to each other via an isolation layer.

4. The acceleration sensor of claim 1, wherein the sample mass comprises a further movable comb-like electrode that is movable together with the sample mass, wherein the further movable comb-like electrode comprises a plurality of teeth which extend along a direction opposite to the positive deflection direction, wherein the acceleration sensor comprises a further counter electrode fixedly connected to the substrate, wherein the further counter electrode comprises a further fixed comb-like electrode, wherein the further fixed comb-like electrode comprises a plurality of teeth which extend along the positive deflection direction, wherein the teeth of the further movable comb-like electrode are configured to engage with the teeth of the further fixed comb-like electrode, and wherein the acceleration sensor comprises a further shielding electrode fixedly connected to the substrate and configured to increase pneumatic damping of the sample mass during a deflection movement of the sample mass.

5. The acceleration sensor of claim 4, wherein the shielding electrode and the further shielding electrode are integrally connected to each other.

6. The acceleration sensor of claim 1, further comprising a spring element coupling the sample mass and the substrate to each other such that the sample mass can perform a deflection movement along the positive deflection direction and such that the sample mass is substantially rigidly supported in a direction perpendicular to the positive deflection direction and parallel to the substrate surface.

7. A method for producing an acceleration sensor, the method comprising:
   forming a substrate having a substrate surface;
   forming a sample mass that is movable relative to the substrate along a positive deflection direction which is substantially parallel to the substrate surface, the sample mass comprising a movable comb-like electrode that is movable together with the sample mass, the movable comb-like electrode comprising a plurality of teeth which extend along the positive deflection direction;
   fixedly connecting a counter electrode to the substrate, the counter electrode comprising a fixed comb-like electrode, the fixed comb-like electrode comprising a plurality of teeth which extend along a direction opposite to the positive deflection direction, the teeth of the movable comb-like electrode configured to engage with the teeth of the fixed comb-like electrode; and
   fixedly connecting a shielding electrode to the substrate, the shielding electrode configured to increase pneumatic damping of the sample mass during a deflection movement of the sample mass,
   wherein the movable comb-like electrode comprises a comb frontward side with a comb frontward surface that is substantially perpendicular to the positive deflection direction,
   wherein the shielding electrode comprises a shielding electrode surface that is substantially parallel to the comb frontward surface,
   wherein the comb frontward surface and the shielding electrode surface are opposite to each other,
   wherein a distance between the comb frontward surface and the shielding electrode surface changes during a deflection movement of the sample mass, the change of the distance being suitable to increase pneumatic damping of the sample mass.

8. The method of claim 7, further comprising:
   adapting a gas pressure of the acceleration sensor to adjust optimal damping of the deflection movement of the sample mass.

9. The method of claim 7, further comprising:
   selecting, at a predetermined gas pressure, a distance between the movable comb-like electrode and the shielding electrode of the acceleration sensor to adjust optimal damping of the deflection movement of the sample mass.

* * * * *